United States Patent Office 3,711,446
Patented Jan. 16, 1973

3,711,446
CROSS-LINKABLE POLYMER COMPOSITIONS COMPRISING ETHYLENICALLY UNSATURATED POLYMER
Karl Brack, Wilmington, Del., assignor to Hercules Incorporated, Wilmington, Del.
No Drawing. Filed July 1, 1971, Ser. No. 158,982
Int. Cl. C08g 41/04
U.S. Cl. 260—77.5 AC
9 Claims

ABSTRACT OF THE DISCLOSURE

Cross-linkable polymer compositions are described which comprise an ethylenically unsaturated polymer, the lactone adduct of a cyclic tertiary amine and a precursor of a polyfunctional nitrile N-oxide or nitrile imine. Typical lactone adducts are the propiolactone adducts of triethylenediamine, quinuclidine and N-methyl morpholine. These compositions, which cross-link on heating, are useful as sealants and adhesives and in coating compositions.

This invention relates to cross-linkable polymer compositions useful in sealants, adhesives, coatings, molding, casting, etc., and to a process of cross-linking said compositions. More particularly, this invention relates to cross-linkable ethylenically unsaturated polymer compositions which cross-link on initiation with heat.

It is known that ethylenically unsaturated polymers can be cross-linked by means of 1,3-dipolar compounds such as polyfunctional nitrile N-oxides or nitrile imines. To utilize such a cross-linking process in, for example, a sealant composition, a precursor of the polyfunctional nitrile N-oxide or imine is used in combination with a latent base or other material that will function to produce the nitrile N-oxide or imine at the desired specific time, i.e., when the sealing or coating composition is applied.

Now in accordance with this invention it has been found that compositions can be prepared which, when heated, will cross-link to solid, insoluble products. Since the composition can be prepared without using any solvents, there is little or no shrinkage upon curing. Typical compositions of this invention contain an unsaturated polymer, a precursor of a polyfunctional nitrile N-oxide or nitrile imine compound and the adduct of a cyclic tertiary amine with a lactone containing three carbon atoms in the lactone ring.

Any unsaturated polymer, containing ethylenic unsaturation where there is at least one hydrogen radical attached to at least one of the carbon atoms of the ethylenic double bond can be used in the compositions of this invention. Where fluid compositions are desired, unsaturated polymers having a molecular weight range of from about 1,000 to about 20,000 are preferred. However, higher molecular weight polymers can be used in conjunction with small amounts of solvents and/or plasticizers to obtain the desired fluidity. Typical unsaturated polymers that can be used are polybutadiene-1,2, polybutadiene-1,4, styrene-butadiene copolymers, isobutylene-isoprene copolymers, natural rubber, polyester resins, such as maleate- and fumarate-containing polyesters and unsaturated acrylate copolyesters, butadiene-acrylonitrile copolymers, ethylene-propylene - dicyclopentadiene terpolymers, polychloroprene, polyisoprene, unsaturated polyurethanes, unsaturated alkyd resins such as tall oil alkyd resins, polyether copolymers and terpolymers containing at least two unsaturated epoxide constituents such as propylene oxide-allyl glycidyl ether copolymers and ethylene oxide-epichlorohydrin-allyl glycidyl ether terpolymers, etc., and blends of these polymers with each other. In addition to the olefinically unsaturated polymers, polymers containing acetylenic unsaturation can be used. In some cases it may be desirable to use partially hydrogenated products of the above unsaturated polymers.

Any precursor of a polyfunctional nitrile N-oxide or nitrile imine compound having the formula selected from the group consisting of

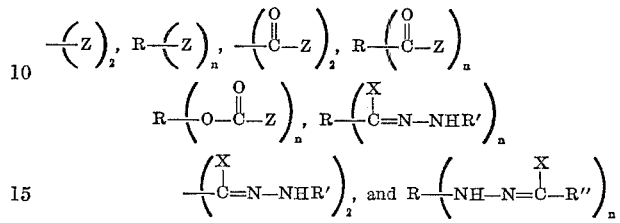

where Z is

Y is —NO$_2$ or a halide radical, i.e., fluorine, chlorine, bromine or iodine, R is an organic radical having a valence greater than 1, generally 2–10, R' is selected from the group consisting of the hydrogen and monovalent hydrocarbon radicals, R" is a monovalent hydrocarbon radical, X is a halide radical and $n$ is an integer equal to the valence of R.

Generally, R will be selected from the group consisting of the hydrocarbon, halide substituted hydrocarbon, hydrocarbonoxy - hydrocarbon, hydrocarbon-thio-hydrocarbon and hydrocarbon-sulfonyl-hydrocarbon polyvalent radicals. In preferred embodiments of this invention R is a divalent hydrocarbon radical selected from the group consisting of alkylene radicals such as, for example, ethylene, trimethylene, tetramethylene, pentamethylene, hexamethylene, octamethylene, decamethylene, dodecamethylene, octadecamethylene, and the like; arylene radicals such as o-, m-, p-phenylene, halogenated o-, m-, p-phenylene, biphenylene, naphthylene, and the like; cycloalkylene radicals such as cyclohexylene, cyclopentylene, cyclooctylene, cyclobutylene, and the like; arylene-dialkylene radicals such as o-, m-, p-xylylene, o-, m-, p-phenylene diethylene and the like; alkylene-diarylene radicals such as methylene bis(o-, m-, p-phenylene), ethylene bis(o-, m-, p-phenylene), and the like; cycloalkylene-dialkylene radicals such as 1,2-, 1,3- and 1,4-cyclohexane dimethylene, 1,2- and 1,3-cyclopentane dimethylene and the like; alkylene oxy alkylene radicals such as ethylene oxy ethylene, and the like; arylene oxy arylene radicals such as phenylene oxy phenylene, and the like; alkarylene oxy alkarylene radicals such as methylene phenylene oxy methylene phenylene, and the like, and the corresponding thio and sulfonyl radicals such as ethylene thio ethylene, phenylene thio phenylene, phenylene methylene thio methylene phenylene, and butylene sulfonyl butylene, and the like.

Generally, the monovalent hydrocarbon radicals in the group from which R' and R" are selected encompass alkyl radicals preferably containing 1–20 carbon atoms such as, for example, methyl, butyl, nonyl, decyl, pentadecyl, and the like; cycloalkyl radicals such as cyclopentyl, cyclohexyl, cyclooctyl, cyclododecyl, and the like; aryl radicals preferably having 1–3 rings such as phenyl, biphenyl, naphthyl, and the like; alkaryl radicals preferably htving 1 or more alkyl groups containing 1–20 carbon atoms and 1–3 rings in the aryl group such as, for example, tolyl, octadecylnaphthyl, and the like; and similar aralkyl radicals, such as benzyl, naphthylhexamethylene, and the like.

Exemplary of the precursors of polyfunctional nitrile N-oxides and nitrile imines used in this invention are the polyfunctional hydrazide halides such as, for instance, isophthaloyl-bis(phenylhydrazide chloride),
terephthaloyl-bis(phenylhydrazide chloride),
isophthaloyl-bis(methylhydrazide chloride),
isophthaloyl-bis(ethylhydrazide fluoride),
terephthaloyl-bis(methylhydrazide chloride),
terephthaloyl-bis(ethylhydrazide bromide),
succinoyl-bis(phenylhydrazide chloride),
adipoyl-bis(methylhydrazide chloride),
p-phenylene dipropionyl-bis(methylhydrazide chloride),
tetramethylene dibenzoyl-bis(butylhydrazide iodide),
N,N'-p-phenylene-bis(benzoyl hydrazide chloride),
N,N'-m-phenylene-bis(benzoyl hydrazide chloride),
glutaryl-bis(phenylhydrazide chloride),
1,4-cyclohexanedicarbonyl-bis(phenylhydrazide chloride),
trimesoyl-tris(phenylhydrazide chloride),
trimesoyl-tris(methylhydrazide chloride),
trimesoyl-tris(ethylhydrazide chloride),
trimellitoyl-tris(phenylhydrazide chloride),
trimellitoyl-tris(methylhydrazine chloride),
pyromellitoyl-tetrakis(butylhydrazide chloride),
benzene pentacarbonyl-pentakis(phenylhydrazide chloride), and the like; the poly(hydroximoyl halides), polyfunctional carbonylhydroximoyl halides, and polyfunctional nitrolic acids such as 2,3-dioxosuccino-bis(hydroximoyl chloride),
methylene-bis(glyoxylohydroximoyl chloride),
ethylene-bis(glyoxylohydroximoyl chloride),
tetramethylene-bis(glyoxylohydroximoyl fluoride),
pentamethylene-bis(glyoxylohydroximoyl chloride),
1,2,3-propanetris(glyoxylohydroximoyl chloride),
1,2,4-pentane-tris(glyoxylohydroximoyl chloride),
1,4-cyclohexane-bis(glyoxylohydroximoyl chloride),
p-phenylene-bis(acetohydroximoyl chloride),
2,2'-thia-bis(acetohydroximoyl chloride),
3,3'-thia-bis(propionohydroximoyl chloride),
isophthalo-bis(hydroximoyl chloride),
terephthalo-bis(hydroximoyl chloride),
4,4'-bis(benzohydroximoyl chloride),
4,4'-methylene-bis(benzohydroximoyl chloride),
4,4'-oxa-bis(benzohydroximoyl chloride),
3,3'-thia-bis(benzohydroximoyl chloride),
p-phenylene-bis(glyoxylohydroximoyl chloride),
4,4'-bis(phenylglyoxylohydroximoyl chloride),
4,4'-methylene-bis(phenylglyoxylohydroximoyl chloride), the ethylene glycol, tetramethylene glycol, 1,4-cyclohexylene glycol, resorcinol, etc., esters of chloroximinoglyoxylic acid, etc., 4,4' - methylene - bis(phenylglyoxylonitrolic acid), m-phenylene-bis(glyoxylonitrolic acid), 4,4'-bis(phenylglyoxylonitrolic acid), etc.

The above-described precursors are converted to nitrile N-oxides or nitrile imines by the action of the lactone adduct of the cyclic tertiary amine. It is believed that these lactone adducts act by abstracting hydrogen halide from the precursor converting it to either a nitrile N-oxide or nitrile imine. The resulting nitrile N-oxide or nitrile imine in turn is believed to react with the double bonds of the polymer by way of 1,3-dipolar addition.

The lactone adducts that are useful, in accordance with this invention, are adducts of lactones containing three carbon atoms in the lactone ring with cyclic tertiary amines, i.e., amines wherein the amino nitrogen is one of the atoms in the heterocyclic structure. Preferably the amines will contain at least one 6-membered heterocyclic structure wherein at least one member is amino nitrogen. The adducts are prepared by reacting the lactone with the cyclic tertiary amine. Any beta-lactone, i.e., a lactone containing 3 carbon atoms in the lactone ring, can be used as, for example, propiolactone, beta-butyrolactone, alpha-phenyl-propiolactone, beta - phenyl - propiolactone, alpha,beta-diphenyl - propiolactone, beta,beta - diphenylpropiolactone, beta-cyclohexyl-propiolactone, etc. Exemplary of the cyclic tertiary amines that can be used are bicyclic amines such as the aza-bicyclo[2·2·2]octanes, for example 1-azabicyclo[2·2·2]octane, also known as quinuclidine,
1-aza-3-hydroxybicyclo[2·2·2]octane, also known as 3-quinuclidinol,
1-aza-3-methoxybicyclo[2·2·2]octane,
1-aza-3-ethoxybicyclo[2·2·2]octane,
1-aza-3-phenoxybicyclo[2·2·2]octane,
1-aza-3-acetoxybicyclo[2·2·2]octane,
1-aza-3-benzoyloxybicyclo[2·2·2]octane,
1-aza-3-ketobicyclo[2·2·2]octane, also known as 3-quinuclidinone,
2-methyl-1-azabicyclo[2·2·2]octane,
2-ethyl-1-azabicyclo[2·2·2]octane,
3-methyl-1-azabicyclo[2·2·2]octane,
3-ethyl-1-azabicyclo[2·2·2]octane,
4-methyl-1-azabicyclo[2·2·2]octane,
2,6-dimethyl-1-azabicyclo[2·2·2]octane,
3,5-dimethyl-1-azabicyclo[2·2·2]octane,
2,2,6-trimethyl-1-azabicyclo[2·2·2]octane,
3-ethyl-3-methyl-1-azabicyclo[2·2·2]octane,
1,4-diazabicyclo[2·2·2]octane, also known as triethylenediamine,
2-methyl-1,4-diazabicyclo[2·2·2]octane,
2-ethyl-1,4-diazabicyclo[2·2·2]octane,
2,3-dimethyl-1,4-diazabicyclo[2·2·2]octane,
2,5-dimethyl-1,4-diazabicyclo[2·2·2]octane,
2,6-dimethyl-1,4-diazabicyclo[2·2·2]octane,
2,5,7-trimethyl-1,4-diazabicyclo[2·2·2]octane,
2,2,5,5-tetramethyl-1,4-diazabicyclo[2·2·2]octane, and the N-alkyl monocyclic amines, where the alkyl group contains from 1 to 6 carbon atoms, as for example N-methyl-morpholine,
N-ethyl-morpholine,
N-isopropyl-morpholine,
N-butyl-morpholine,
N-methyl-piperidine,
N-propyl-piperidine,
N-hexyl-piperidine,
N,N-dimethyl-piperazine,
N,N-diethyl-piperazine,
N,N-butyl-piperazine, etc.

The reaction can be carried out in any inert diluent, preferably one that is a solvent for the two reactants, and a non-solvent for the adduct that is produced. Exemplary of the diluents that can be used are hydrocarbons including aliphatic, cycloaliphatic and aromatic hydrocarbons such as pentane, hexane, octane, decane, benzene, toluene, xylene, and mixtures of these hydrocarbons, as for example, the petroleum hydrocarbon fractions, alcohols such as methanol, ethanol, etc., ethers such as diethyl ether, tetrahydrofuran, etc., esters such as ethyl acetate, ketones such as acetone, methyl ethyl ketone, methyl isobutyl ketone, etc., and other diluents such as dimethylsulfoxide, acetonitrile and dimethyl formamide. The reaction is generally carried out at room temperature and atmospheric pressure, but a temperature from about —15° C. to about 100° C. can be used.

When a monoamine is used, there will be formed a 1:1 adduct with the lactone. However, when a diamine is used, either a 1:1 or 1:2 adduct, or a mixture thereof, can be produced, depending on the ratio of the reactants. Thus, for the production of a 1:1 adduct of the diamine, there will preferably be used less than a mole to mole ratio of the lactone to the diamine to insure production of the 1:1 adduct. Otherwise, there will generally be used an excess of the lactone.

Varied amounts of the three basic ingredients can be employed in preparing the cross-linkable compositions of this invention, depending upon the degree of cross-linking desired, the nature of the unsaturated polymer, etc. In general the amount of nitrile N-oxide or nitrile imine precursor employed (based on the weight of the polymer) will be from about 0.1% to about 30%, preferably from about 1% to about 10%. The lactone adduct of the cyclic tertiary amine will be present in amounts sufficient to convert the precursor to the corresponding nitrile N-oxide or nitrile imine, preferably in an excess of from about 1% to about 30% over that required to convert the precursor.

The cross-linkable compositions of this invention can be prepared by blending or admixing the ingredients in any desired fashion. For example, the unsaturated polymer and precursor can be dissolved in an anhydrous volatile solvent therefor and then admixed with the lactone adduct plus any other materials. After mixing, the solvent can be removed under reduced pressure.

It may be desirable in certain cases to modify the compositions by partially reacting the precursor with the polymer. For example, a bis(carbohydroximoyl chloride) can be treated with sufficient of the lactone adduct to only convert approximately half of the hydroximoyl chloride groups to nitrile N-oxide groups. When this treatment is conducted in the presence of the unsaturated polymer, the nitrile N-oxide groups will add onto the polymer at its double bonds, producing an unsaturated polymer substituted with carbohydroximoyl chloride substituents. Additional lactone adduct can be added to the carbohydroximoyl chloride substituted polymer. The resulting composition is stable until heated, at which time the hydroximoyl chloride groups convert to nitrile N-oxide groups which cross-link the polymer.

In addition to the three basic ingredients, other additives can be incorporated. Typical additives are fillers such as carbon black, titanium dioxide, silica, diatomaceous earth, talc, etc.; plasticizers such as phthalates, adipates, sebacates, fatty acid esters of pentaerythritol, fatty acid esters of dipentaerythritol, etc.; stabilizers; adhesive promoters, pigments; and so forth. Obviously there are many cases in which other additives are not required or desired, and excellent results are achieved when only the basic ingredients are employed.

As indicated above, cross-linking is initiated by heating the above-described composition. The specific conditions required for cross-linking depend upon the lactone adduct utilized. In general, the compositions will be cross-linked by heating at a temperature from about 90° C. to about 180° C. for a period of from about 0.5 minute to about 120 minutes. The compositions are relatively stable and can be stored at room temperature for months with little or no detectable cross-linking.

The compositions of this invention are useful in numerous applications. For example, they can be used as one component sealants such as caulking compositions which are fluid enough to extrude into a joint from a caulking gun but will not flow once placed in the joint and which cross-link on heating. Another use is as an adhesive. Compositions of this invention are excellent adhesives for bonding glass, metal, wood, plastics, fibers, fabrics, etc. Another use is in coating compositions. Still another use is in rubber casting or molding. Further uses will be apparent to those skilled in the arts.

The following examples will further illustrate the compositions of this invention. All parts and percentages are by weight unless noted otherwise.

EXAMPLE 1

A solution of 50 parts of propiolactone in 250 parts of anhydrous toluene was added dropwise over 2 hours at room temperature to a solution of 200 parts of triethylenediamine in 600 parts of anhydrous toluene. The reaction mixture was stirred at room temperature for eight additional hours. Then the solids were isolated by filtration under a nitrogen blanket and washed exhaustively with anhydrous benzene. After drying the product amounted to 121 parts, had a melting point of 169–172° C., and was soluble in methanol. Analysis for carbon, hydrogen and nitrogen (Found: 57.8, 8.8 and 15.0%, respectively; Calculated: 58.7, 8.68 and 15.25%) showed that the product was the mono-propiolactone adduct of triethylenediamine.

Five (5) parts of a branched, ethylenically triunsaturated urethane copolymer having a molecular weight of approximately 5000, 90 parts of a linear, ethylenically diunsaturated urethane copolymer having a molecular weight of approximately 15,000, 3 parts of bis(phenylglyoxylohydroximoyl chloride), and 3 parts of the above prepared monopropiolactone adduct of triethylenediamine were mixed on a 3-roll mill until homogeneous.

The smooth tan paste was storable at room temperature under exclusion of moisture for 2 months without a change in viscosity.

A sample of this paste was heated to 120° C. for ½ hour. During this time it turned into a tough rubber, which was insoluble in tetrahydrofuran.

EXAMPLE 2

A solution of 10.0 parts of triethylenediamine in 500 parts of anhydrous methanol was stirred with external ice cooling under a nitrogen blanket. A solution of 30.0 parts of propiolactone in 200 parts of anhydrous methanol was added dropwise. The reaction mixture was stirred for 16 hours at 0° C. During this time a large amount of white precipitate formed. The solids were isolated by filtration under anhydrous conditions. The solids were washed exhaustively with anhydrous methanol and then dried under vacuum for 20 hours. The product so obtained amounted to 21.1 parts and it had a melting point of 125–131° C. Analysis for carbon, hydrogen and nitrogen (Found: 55.7, 7.95, and 11.1%, respectively; Calculated: 56.2, 7.81, and 10.94%) showed that the product was the bis(propiolactone) adduct of triethylenediamine.

Fifty (50) parts of a branched, ethylenically triunsaturated urethane copolymer, having a molecular weight of approximately 5000, 6.0 parts of bis(phenylglyoxylohydroximoyl chloride), and 8.0 parts of the above-prepared bis(propiolactone) adduct of triethylenediamine were milled together until a homogeneous paste was obtained.

This paste was stored at room temperature under exclusion of moisture for 3 months without a change in viscosity.

A sample of this paste was heated to 120° C. for 20 minutes. During this time it cross-linked to a tough rubber, which was insoluble in tetrahydrofuran and methylene chloride.

EXAMPLE 3

A solution of 10.0 parts of 3-quinuclidinone in 300 parts of anhydrous tetrahydrofuran was stirred and cooled externally with ice. Under a nitrogen blanket a solution of 12.0 parts of propiolactone in 100 parts of anhydrous tetrahydrofuran was added dropwise. After the addition was completed, the reaction mixture was allowed to warm to room temperature and stirred at room temperature overnight. The product was isolated by filtration under anhydrous conditions, washed exhaustively with anhydrous tetrahydrofuran, and dried under vacuum at room temperature for 16 hours. There was obtained 13.6 parts of the propiolactone adduct of 3-quinuclidinone. Analysis showed it to contain 60.3% carbon, 7.9% hydrogen and 7.0% nitrogen (theory is 60.9, 7.6 and 7.1%, respectively).

Thirty (30) parts of a diallyl isophthalate prepolymer (having a molecular weight of approximately 2000, an iodine number of 26, and a specific gravity of 1.3), 6.3 parts of finely powdered trimesoyl tris(phenylhydrazide chloride), 10 parts of titanium dioxide as a filler, and 10 parts of a chlorinated wax plasticizer were milled together in a 3-roll mill until homogeneous. Then 7.5 parts of the above-prepared propiolactone adduct of 3-quinuclidinone were added. The mixture was milled until a homogeneous paste was obtained.

This paste can be stored at room temperature under exclusion of moisture for 2 months without cross-linking.

A sample of the above formulation was heated to 120° C. for 1 hour. During this time it cross-linked to a tough rubber, which was insoluble in tetrahydrofuran.

EXAMPLE 4

A solution of 25.0 parts of 3-quinuclidinol dissolved in 750 parts of anhydrous tetrahydrofuran was stirred under a nitrogen blanket and cooled externally with ice. Dropwise a solution of 37.5 parts propiolactone in 150 parts of anhydrous tetrahydrofuran was added over 1 hour. The stirring at 0° C. was continued for an additional one hour. Then the reaction mixture was stirred at room temperature for 16 hours. The solids which formed were isolated by filtration under anhydrous conditions and washed exhaustively with anhydrous tetrahydrofuran. The solids were dried under vacuum at room temperature for 16 hours. There was obtained 31.3 parts of the propiolactone adduct of 3-quinuclidinol which had a melting point of 182–185° C. Analysis showed it to contain 60.2% carbon, 8.8% hydrogen and 6.9% nitrogen (theory is 60.2, 8.5 and 7.0%, respectively).

On a 3-roll mill, 40 parts of a copolymer of isobutylene and butadiene (having a molecular weight of approximately 8000 and containing 5 mole percent butadiene) is mixed with 3 parts of terephthalo bis(hydroximoyl chloride). Then subsequently 10 parts of titanium dioxide and 10 parts of chlorinated paraffin wax plasticizer are added. Finally, 5.5 parts of the above-prepared propiolactone adduct of 3-quinuclidinol were added. A smooth paste was obtained which could be stored at room temperature under exclusion of moisture for several months without cross-linking.

A small sample of the above mixture was heated to 120° C. for 30 minutes. During this time it cross-linked to a tough rubber, which was insoluble in tetrahydrofuran as well as methylene chloride.

EXAMPLE 5

A solution of 7.2 parts of quinuclidine in 250 parts of anhydrous tetrahydrofuran was cooled in an ice-salt cooling bath. While stirring vigorously, a solution of 17.0 parts of propiolactone in 40.0 parts of tetrahydrofuran was added dropwise at such a rate as to maintain the temperature of the reaction mixture between −20 and −15° C. After the addition was completed, the reaction mixture was stirred at −20° C. for an additional 2 hours. It was then allowed to warm to room temperature and the solids were separated by filtration under anhydrous conditions. After washing with anhydrous tetrahydrofuran, the product was dried under vacuum at room temperature for 16 hours. There was obtained 9.6 parts of a white solid having a melting point of 138–141° C. The product was identified as 1,3-propiolactone adduct of quinuclidine by its nuclear magnetic resonance spectrum as well as by elemental analysis (Found: 65.1% carbon, 9.71% hydrogen and 7.4% nitrogen; Calculated: 65.5, 9.28 and 7.65%, respectively).

In a mixer, 60 parts of a copolymer of butadiene and acrylonitrile (having a molecular weight of approximately 6000 and containing 4 mole percent of butadiene) and 11 parts of bis(phenylglyoxylohydroximoyl chloride) were mixed until a homogeneous paste was obtained. Then 10 parts of titanium dioxide were milled in as a filler, followed by 12 parts of the above-prepared propiolactone adduct of quinuclidine. A smooth cream was obtained which was storable at room temperature under exclusion of moisture for 3 months without a change in viscosity.

A sample of the above formulation was heated to 120° C. for 3 minutes, then allowed to sit at room temperature for 4 hours. During this time, it cross-linked to a tough rubber which was insoluble in tetrahydrofuran.

EXAMPLE 6

A mixture of 40 parts of N-methyl-morpholine and 400 parts of anhydrous tetrahydrofuran was stirred at room temperature. Under a nitrogen blanket there was added, dropwise, 60 parts of propiolactone at such a rate that the temperature of the reaction mixture did not exceed 25° C. The precipitate, which formed, was isolated by filtration, washed exhaustively with anhydrous tetrahydrofuran and dried under vacuum at room temperature for 16 hours. There was obtained 21 parts of a white solid having a melting point of 108–112° C. Analysis for carbon, hydrogen and nitrogen (Found: 54.3, 8.6 and 7.5%, respectively; Calculated: 55.5, 8.6 and 8.1%) showed that the product was the propiolactone adduct of N-methyl-morpholine.

Fifty (50) parts of a branched, ethylenically triunsaturated urethane copolymer having a molecular weight of approximately 5000, 6.0 parts of bis(phenylglyoxylohydroximoyl chloride), 10 parts of titanium dioxide and 20 parts of a chlorinated wax plasticizer were milled until homogeneous. A smooth paste was obtained which was storable at room temperature under exclusion of moisture for 3 months without a change in viscosity.

A sample of this paste was heated to 140° C. for ½ hour. During this time it cross-linked to a tough rubber, which was insoluble in tetrahydrofuran.

What I claim and desire to protect by Letters Patent is:

1. A cross-linkable polymer composition comprising (1) an ethylenically unsaturated polymer having at least one hydrogen radical attached to at least one of the carbon atoms of the ethylenic double bond, (2) the adduct of a cyclic tertiary amine and a lactone containing three carbon atoms in the lactone ring and (3) a precursor of a polyfunctional nitrile N-oxide or nitrile imine having the formula selected from the group consisting of

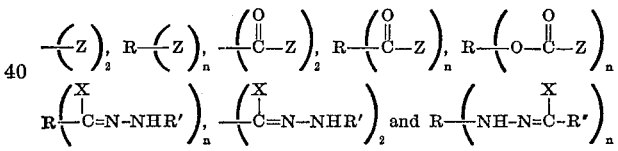

where Z is

Y is —NO₂ or a halide radical, R is an organic radical having a valence of from 2 to 10, R' is selected from the group consisting of hydrogen and monovalent hydrocarbon radicals, R'' is a monovalent hydrocarbon radical, X is a halide radical and $n$ is an integer equal to the value of R.

2. The composition of claim 1 wherein the adduct is the propiolactone adduct of an aza-bicyclo[2·2·2]octane.

3. The composition of claim 1 wherein the adduct is the propiolactone adduct of an N-alkyl monocyclic amine where the alkyl group contains from 1 to 6 carbon atoms.

4. The composition of claim 2 wherein the aza-bicyclo [2·2·2]octane is quinuclidine.

5. The composition of claim 2 wherein the aza-bicyclo [2·2·2]octane is triethylenediamine.

6. The composition of claim 2 wherein the aza-bicyclo [2·2·2]octane is 3-quinuclidinol.

7. The composition of claim 3 wherein the N-alkyl monocyclic amine is N-methyl morpholine.

8. A process for cross-linking an ethylenically unsaturated polymer, having at least one hydrogen radical attached to at least one of the carbon atoms of the ethylenic double bond, which comprises heating said polymer in admixture with an adduct of cyclic tertiary amine and a lactone containing three carbon atoms in the lactone ring and with a precursor of a polyfunctional nitrile N-oxide or nitrile imine having the formula selected from the group consisting of

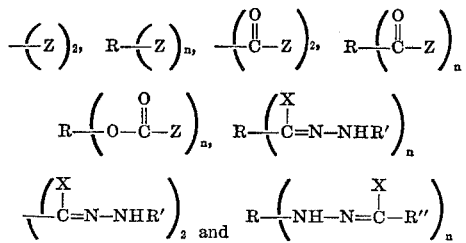

where Z is

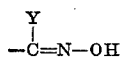

Y is $-NO_2$ or a halide radical, R is an organic radical having a valence of from 2 to 10, R' is selected from the group consisting of hydrogen and monovalent hydrocarbon radicals, R'' is a monovalent hydrocarbon radical, X is a halide radical and $n$ is an integer equal to the valence of R.

9. The process of claim 8 wherein the lactone is propiolactone.

References Cited

UNITED STATES PATENTS

| | | | |
|---|---|---|---|
| 3,454,506 | 7/1969 | Brack | 260—2.5 |
| 3,503,906 | 3/1970 | Brack | 260—2.5 |
| 3,576,908 | 4/1971 | Brack | 260—858 |
| 3,592,784 | 7/1971 | Brack | 260—2.5 |
| 3,627,715 | 12/1971 | Brack | 260—22 |

DONALD E. CZAJA, Primary Examiner

R. W. GRIFFIN, Assistant Examiner

U.S. Cl. X.R.

117—122 PA; 161 KP, 161 R; 156—327, 338; 260—22 R, 28.5 B, 28.5 R, 40 R, 41 R, 41.5 R, 75 N, 77.5 R, 82.3, 85.3

PO-1050
(5/69)

UNITED STATES PATENT OFFICE
CERTIFICATE OF CORRECTION

Patent No. 3,711,446            Dated January 16, 1973

Inventor(s) Karl Brack (Case 27)

It is certified that error appears in the above-identified patent and that said Letters Patent are hereby corrected as shown below:

```
Column 8, line 55, Claim 1 -
    "value" should read --valence--
```

Signed and sealed this 29th day of May 1973.

(SEAL)
Attest:

EDWARD M. FLETCHER, JR.　　　　　　ROBERT GOTTSCHALK
Attesting Officer　　　　　　　　　　Commissioner of Patents